(12) United States Patent
Lin

(10) Patent No.: US 9,743,755 B2
(45) Date of Patent: Aug. 29, 2017

(54) LIFTING DEVICE

(71) Applicant: Yen-Chun Lin, Tainan (TW)

(72) Inventor: Yen-Chun Lin, Tainan (TW)

(*) Notice: Subject to any disclaimer, the term of this patent is extended or adjusted under 35 U.S.C. 154(b) by 14 days.

(21) Appl. No.: 14/856,740

(22) Filed: Sep. 17, 2015

(65) Prior Publication Data
US 2017/0079424 A1    Mar. 23, 2017

(51) Int. Cl.
| F16M 11/00 | (2006.01) |
| A47B 9/10 | (2006.01) |
| A47C 3/30 | (2006.01) |
| A47B 19/06 | (2006.01) |
| F16B 7/10 | (2006.01) |
| A47B 9/20 | (2006.01) |
| B66F 3/00 | (2006.01) |

(52) U.S. Cl.
CPC ............ *A47B 9/10* (2013.01); *A47B 9/20* (2013.01); *A47B 19/06* (2013.01); *A47C 3/30* (2013.01); *B66F 3/00* (2013.01); *F16B 7/10* (2013.01); *A47B 2200/0052* (2013.01)

(58) Field of Classification Search
CPC ........... A47B 9/00; A47B 19/06; A47B 39/02; A47B 41/02; F16B 7/10; F16M 11/10; B62D 1/18; E04H 12/182
USPC .............. 248/161, 157, 125.1, 188.5, 188.2, 248/295.11, 298.1, 32; 297/344.18, 297/423.1; 108/144.1, 147.19
See application file for complete search history.

(56) References Cited

U.S. PATENT DOCUMENTS

| 2,835,520 A * | 5/1958 | Schiring | A61B 6/4464 248/333 |
| 3,285,207 A * | 11/1966 | Vom | A47B 9/083 108/106 |
| 3,521,341 A * | 7/1970 | Hornlein | A47B 9/20 248/161 |
| 3,887,155 A * | 6/1975 | Bertalot | F16B 7/10 108/147.19 |
| 6,021,722 A * | 2/2000 | Raycraft | A47B 9/10 108/147 |
| 6,189,843 B1 * | 2/2001 | Pfister | A47B 9/083 248/157 |
| 7,559,516 B2 * | 7/2009 | Koder | A47B 9/20 108/147 |
| 2002/0050112 A1 * | 5/2002 | Koch | A47B 9/20 52/651.07 |

(Continued)

*Primary Examiner* — Kimberly Wood
(74) *Attorney, Agent, or Firm* — Rosenberg, Klein & Lee (57) ABSTRACT

A lifting device includes a driving unit, a moving tube, and a rolling unit. The driving unit includes an activating shaft having one end connected to an external object, a sleeve being fixed around the activating shaft and having axially extending flat surfaces, an activating cylinder connected to an opposite end of the activating shaft for driving the activating shaft to move with respect to the sleeve, and a controlling member connected to the activating cylinder for controlling the activating cylinder. The moving tube is mounted around the sleeve and connected to the external object. The movement of the activating shaft synchronously makes the moving tube move upward or downward. The rolling unit includes a plurality of rollers that are rotatably attached to the moving tube and maintain contacting the flat surfaces of the sleeve. Thereby, the lifting device lifts and lowers the external object stably.

6 Claims, 7 Drawing Sheets

(56) References Cited

U.S. PATENT DOCUMENTS

2003/0033963 A1\* 2/2003 Doyle ..................... A47B 9/04
108/147.19

\* cited by examiner

LIFTING DEVICE

BACKGROUND OF THE INVENTION

1. Technical Field

The present invention relates to lifting device, and more particularly to a lifting device that is designed to lift and lower an external object stably.

2. Description of Related Art

A table adjustable in terms of height is convenient and welcome by various users. There are thus lifting devices designed to lift and lower a table top to a desired altitude, such as Taiwan Patent No. M461623U1, titled "Lifting Device." Referring to FIG. 1 and FIG. 2, the prior-art lifting device includes an upper seat 11, a gas struts 12 attached to the upper seat 11 from below, two supporting posts 13 extending downward from the upper seat 11, and a lower seat 14 for receiving the gas struts 12 and the supporting posts 13. The gas struts 12 has a piston rod 121 connected to the upper seat 11, and a cylinder tube 122 mounted around the piston rod 121. The supporting posts 13 are located at two opposite sides of the gas struts 12. Each of the supporting posts 13 has an outer peripheral surface 131, a plurality of rings 132 spaced and fitted around the outer peripheral surface 131, a plurality of balls 133 movably received in the rings 132, and a retaining block 134 fixed to the lower end of the outer peripheral surface 131 for preventing the rings 132 from escaping. The lower seat 14 has a vertical stand 141, a through hole 142 passing through the vertical stand 141 for receiving the cylinder tube 122 of the gas struts 12, and two sleeves 143 installed in the vertical stand 141 for receiving the two supporting posts 13. When the device is properly assembled, the balls 133 press on the outer peripheral surface 131 of the supporting post 13 and the inner peripheral surface 144 of the sleeve 143. Additionally, the upper seat 11 can be fixed to a table top 2 at the latter's bottom.

Figure 1:
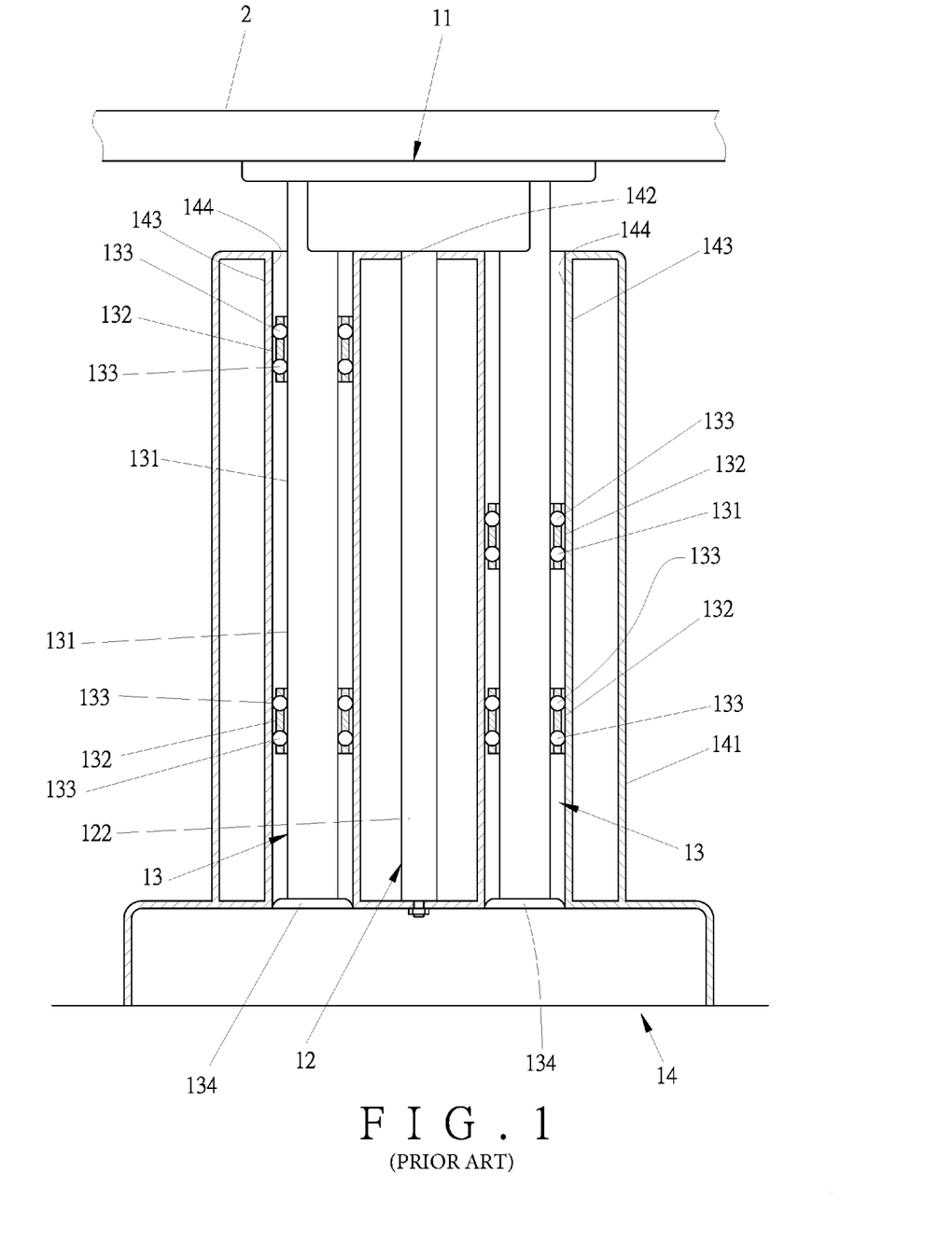
FIG. 1 is a cross-sectional view of a lifting device disclosed in Taiwan Patent No. M461623U1, showing a plurality of balls pressing on outer peripheral surfaces of two supporting posts and inner peripheral surfaces of two sleeves.
Figure 2:
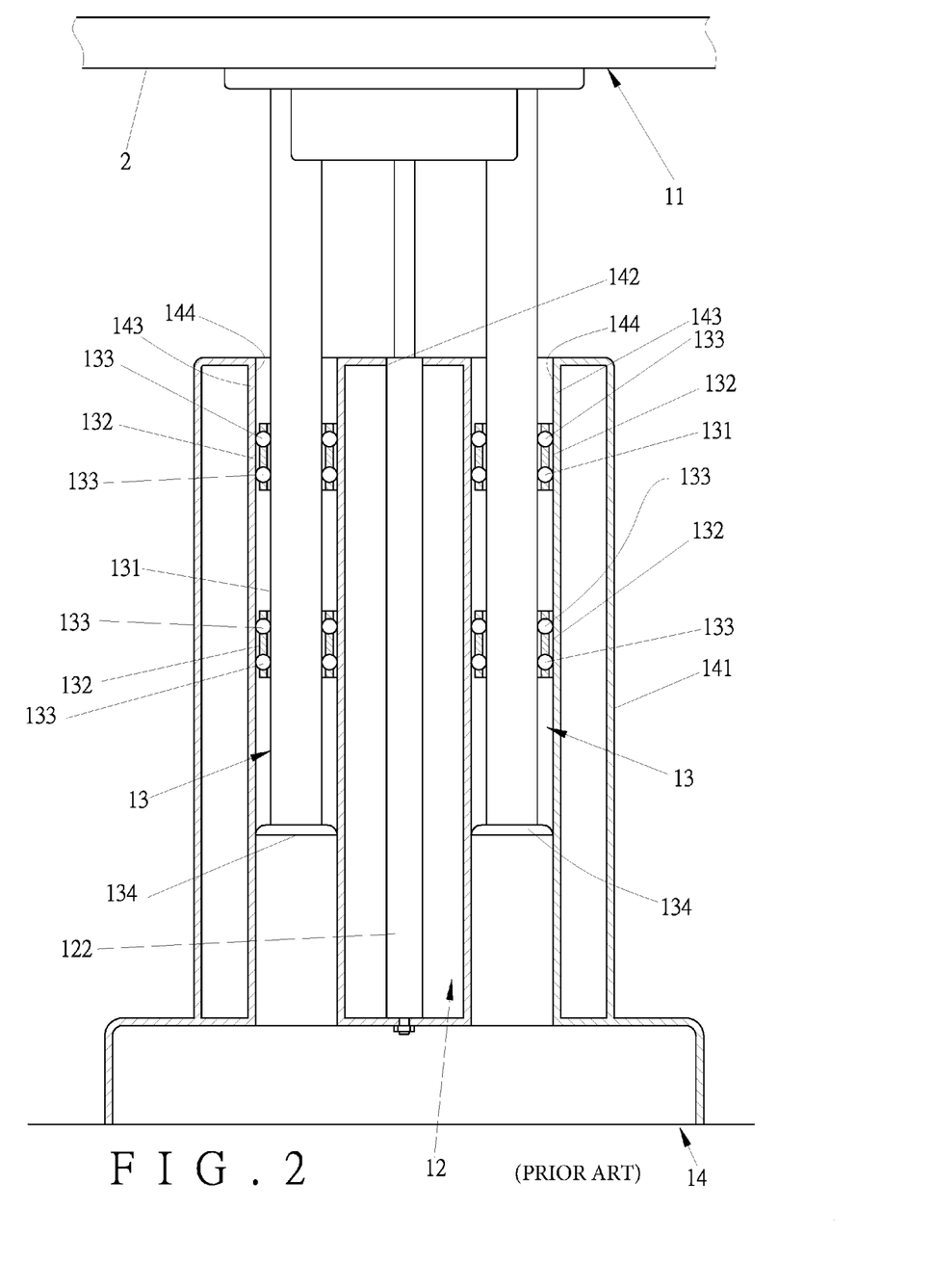
FIG. 2 is another cross-sectional view of the lifting device of FIG. 1, showing the two supporting posts elevating an external object to a higher place.

In use, by making the piston rod 121 expand and retract in the cylinder tube 122, the supporting posts 13 are driven to move upward or downward in the sleeves 143 as the balls 133 roll along the outer peripheral surfaces 131 of the supporting posts 13 and the inner peripheral surfaces 144 of the sleeve 143, in turn changing the altitude of the table top 2.

However, the function of the prior-art lifting device relies the rings 132 fitted around each of the outer peripheral surface 131 of the supporting post 13 and the balls 133 installed in the rings 132, which involve complicated and time-consuming assembling works. Besides, the contact between the balls 133 and both the outer peripheral surface 131 of the supporting post 13 and inner peripheral surface 144 of the sleeve 143 is point contact, which generates detrimental contact pressure at the contact points and tends to make the balls 133 become worn prematurely.

SUMMARY OF THE INVENTION

Hence, one objective of the present invention is to provide a lifting device that is designed to lift and lower an external object stably.

The present invention provides a lifting device for lifting and lowering an external object. The lifting device comprises a driving unit, a moving tube and a rolling unit. The driving unit includes an activating shaft that has one end connected to a bottom of the external object, a sleeve that is fixed around the activating shaft, an activating cylinder that is connected to an opposite end of the activating shaft and drives the activating shaft to expand and retract with respect to the sleeve, and a controlling member that is connected to the activating cylinder and controls operation of the activating cylinder, wherein the sleeve has at least two axially extending flat surface. The moving tube is mounted around the sleeve and has one end connected to a bottom of the external object, so that when the activating shaft expands or retracts with respect to the sleeve the moving tube is synchronously driven to move upward or downward. The rolling unit including a plurality of rollers that are rotatably attached to the moving tube and maintain contacting the flat surfaces of the sleeve, wherein each said roller has a barrel, an axle that passes through the barrel and has two ends affixed to the moving tube, and two bearings that are separated and connected between the barrel and the axle so as to allow the barrel to rotate about the axle.

The present invention is beneficial because the rolling unit is structurally simple and easy to assemble. In addition, with the rolling unit, the rollers on the moving tube and the flat surfaces of the sleeve maintain surface contact throughout the process where the activating cylinder drives the activating shaft to expand and retract. Since the contact pressure is distributed but not focused on one single point, the barrels of the rollers can be protected from excessive wear. Also, steady upward and downward movement of the moving tube with respect to the sleeve is ensured. As a result, the external object can receive reliable support and is prevented from fluctuation during displacement.

DETAILED DESCRIPTION OF THE INVENTION

The invention as well as a preferred mode of use, further objectives and advantages thereof will be best understood by reference to the following detailed description of illustrative embodiments when read in conjunction with the accompanying drawings.

Figure 3:
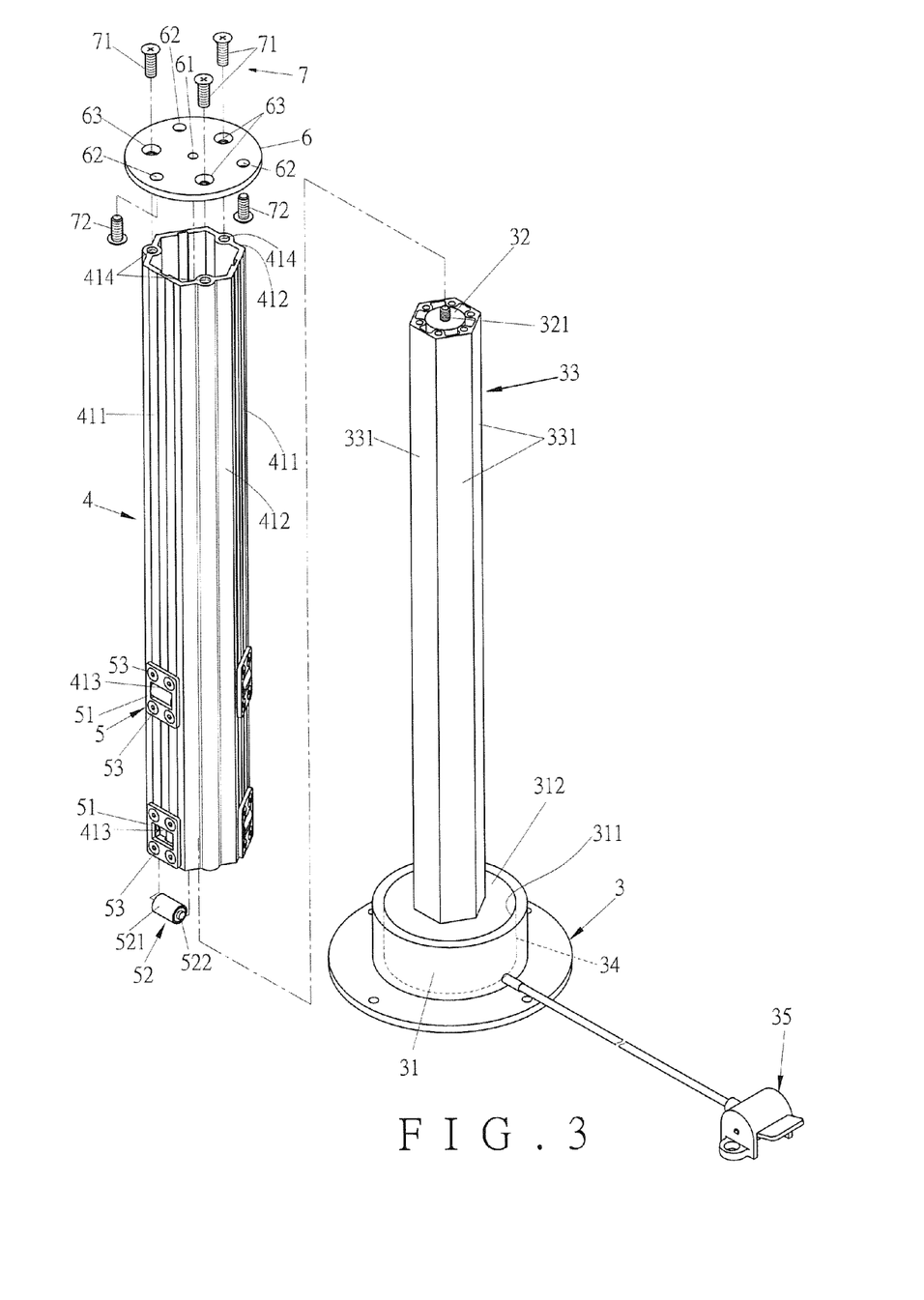
FIG. 3 is an exploded view illustrating one embodiment of a lifting device of the present invention.
Figure 4:
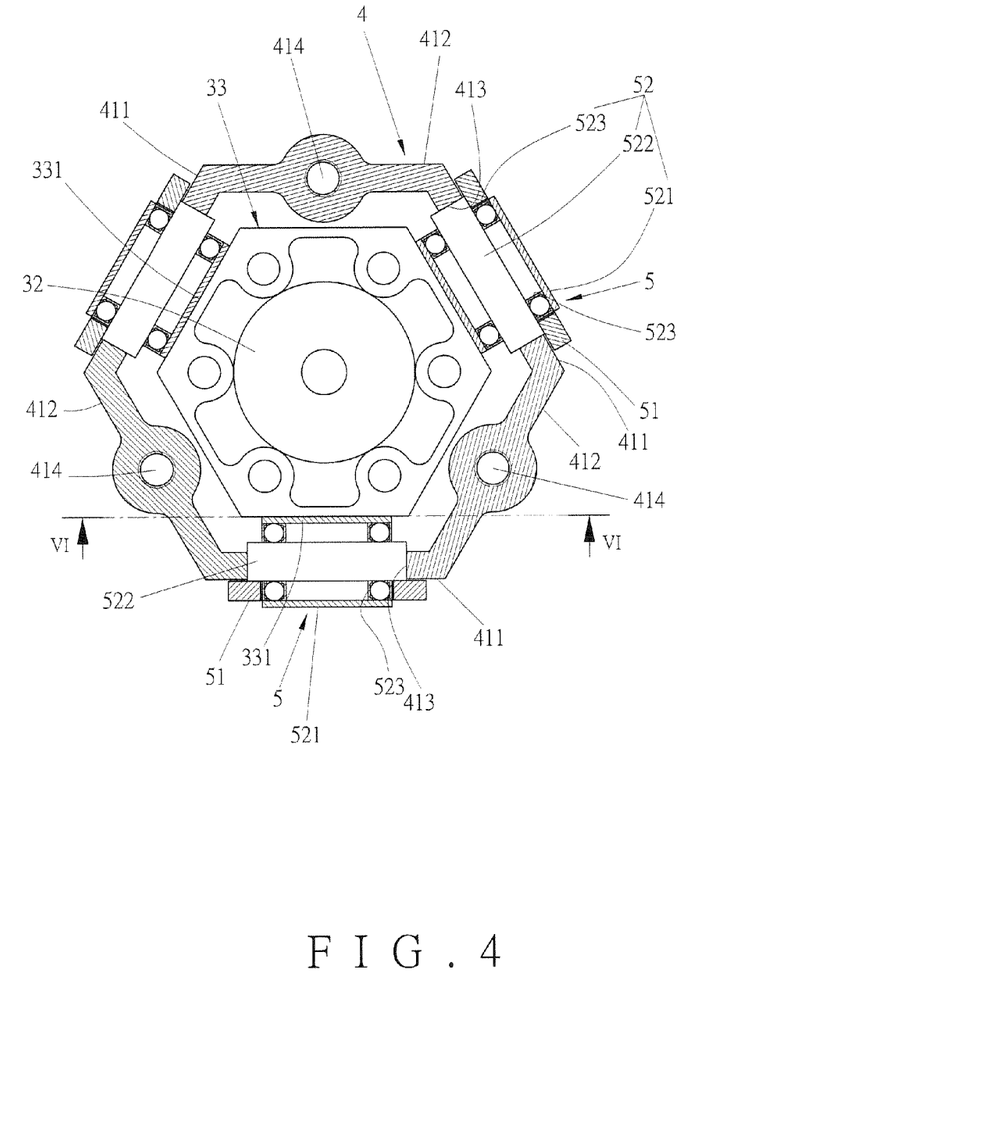
FIG. 4 is a cross-sectional view of the lifting device of FIG. 3.

Referring to FIGS. 3 and 4, in one embodiment of the present invention, a lifting device comprises a driving unit 3, a moving tube 4, and a rolling unit 5.

The driving unit 3 includes a base 31 settled on the ground, an activating shaft 32, a sleeve 33, an activating cylinder 34, and a controlling member 35. The base 31 has a positioning socket 311 and a lid 312. The activating cylinder 34 is installed in the positioning socket 311. It is to be noted that the activating cylinder 34 in the present embodiment is illustratively a pneumatic cylinder, but not limited thereto. The lid 312 serves to close the positioning socket 311 and thereby cover the activating cylinder 34. The activating shaft 32 has its lower end passing through the lid 312 and connected to the activating cylinder 34. The activating shaft 32 has its upper end provided with a projecting screw portion 321. The sleeve 33 is a polygonal tube and has a plurality of axially extending flat surfaces 331. The sleeve 33 is fixed around the activating shaft 32 and has its lower end fixed to the lid 312. The controlling member 35 is connected to the activating cylinder 34 and exposed outside the base 31 for a user to depress and thereby control operation of the activating cylinder 34, which in turn drives the activating shaft 32 to expand or retract.

The moving tube 4 is defined by a polygonal tube wall 41. The tube wall 41 has a plurality of axially extending mounting planes 411, a plurality of joining planes 412 each linking two adjacent said mounting planes 411, a plurality of through holes 413 formed on the mounting planes 411, and a plurality of threaded bores 414 formed at its upper end edge and aligned with the joining planes 412.

Figure 6:
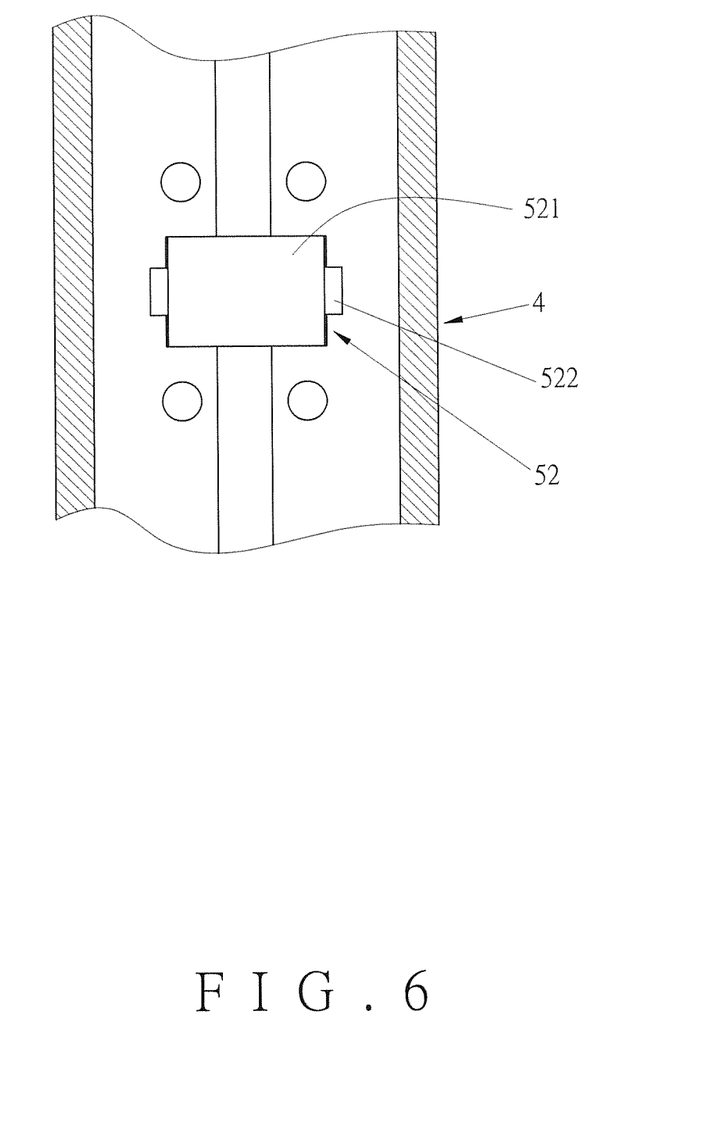
FIG. 6 is a cross-sectional view of the lifting device taken along Line VI-VI of FIG. 4.

Referring to FIGS. 3, 4 and 6, the rolling unit 5 includes a plurality of retaining plates 51 attached to outer surfaces of the mounting planes 411 for covering the through holes 413, a plurality of rollers 52 each received in one said through hole 413 of the moving tube 4, and a plurality of fixing members 53 used for fixing the retaining plates 51 to the outer surfaces of the mounting plane 411. Therein, each of the rollers 52 has a barrel 521, an axle 522, and two bearings 523. The axle 522 passes through the barrel 521 and has its two ends fixed to the tube wall 41 of the moving tube 4. The two bearings 523 of the roller 52 are separated and connected between the barrel 521 and the axle 522 so that the barrel 521 is allowed to rotate about the axle 522.

In addition, the lifting device further comprises a combining plate 6 and a fixing unit 7. The combining plate 6 includes a central threaded hole 61, and also includes a plurality of positioning holes 62 and a plurality of fixing holes 63 surrounding the central threaded hole 61. The fixing unit 7 includes a plurality of first screw members 71 and a plurality of second screw members 72. The first screw member 71 is in the form of a countersunk screw.

Referring to FIGS. 3 and 4, for assembling the disclosed device, the first step is to install the rollers 52 of the rolling unit 5 onto the tube wall 41 of the moving tube 4. Then the moving tube 4 is mounted around the sleeve 33 such that the flat surfaces 331 of the sleeve 33 are aligned with the mounting planes 411 of the moving tube 4 and that the barrels 521 of the rollers 52 each have one part exposed outside the through hole 413 and have the rest remaining inside the tube wall 41 of the moving tube 4 and continuously pressing on the corresponding flat surface 331 of the sleeve 33. Afterward, the combining plate 6 is placed on the activating shaft 32, the sleeve 33 and the moving tube 4, so that the screw portion 321 of the activating shaft 32 is combined with the central threaded hole 61 of the combining plate 6 and the positioning holes 62 of the combining plate 6 are vertically aligned with the threaded bores 414 of the moving tube 4. Then the first screw members 71 pass through the positioning holes 62 of the combining plate 6 and are screwed into the threaded bores 414, so that the combining plate 6 is assembled atop the activating shaft 32, the sleeve 33 and the moving tube 4. The assembling operation of the lifting device is thus rapidly completed.

Figure 5:
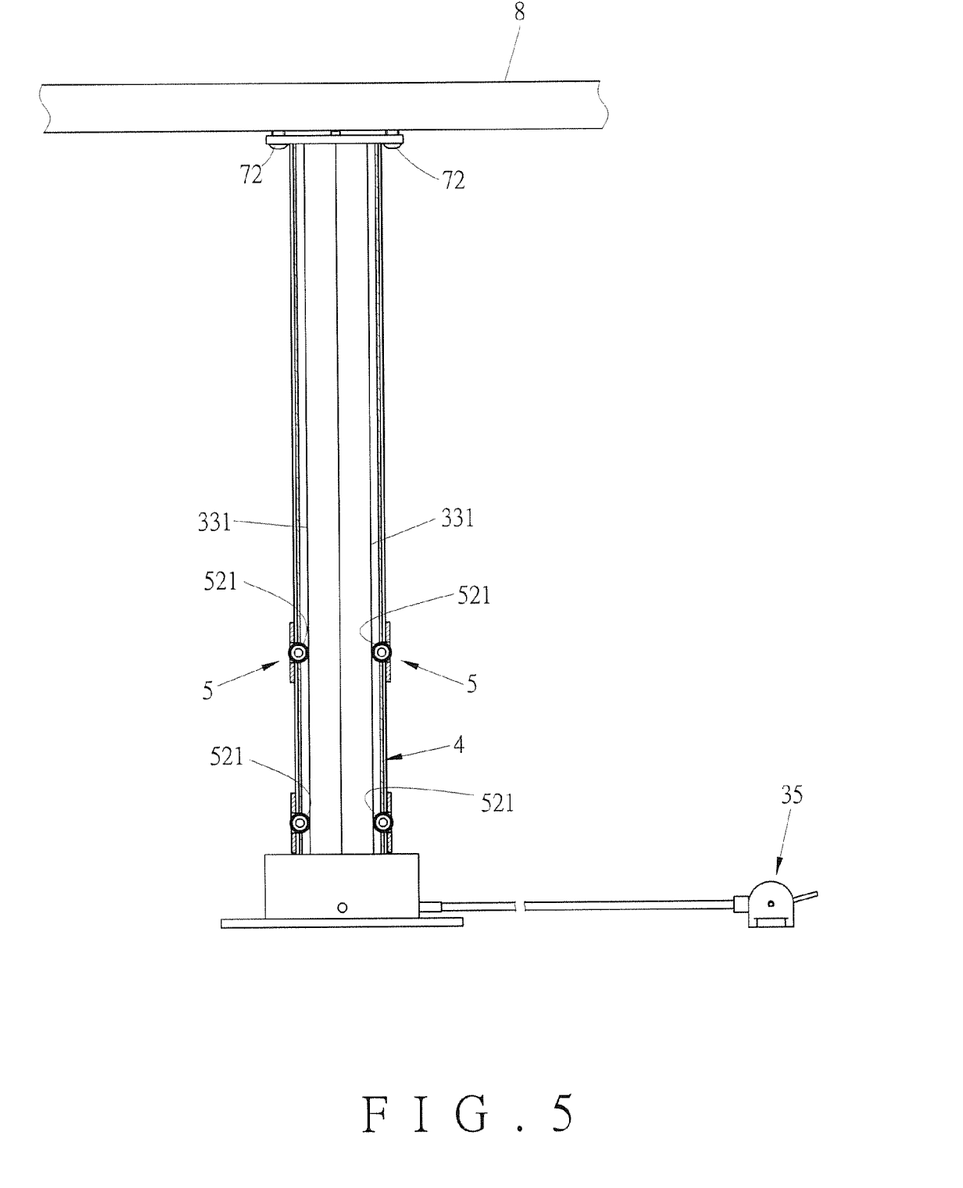
FIG. 5 is an applied view of the lifting device of FIG. 3 showing the lifting device assembled to the bottom of an external object and not upholding the external object yet.
Figure 7:
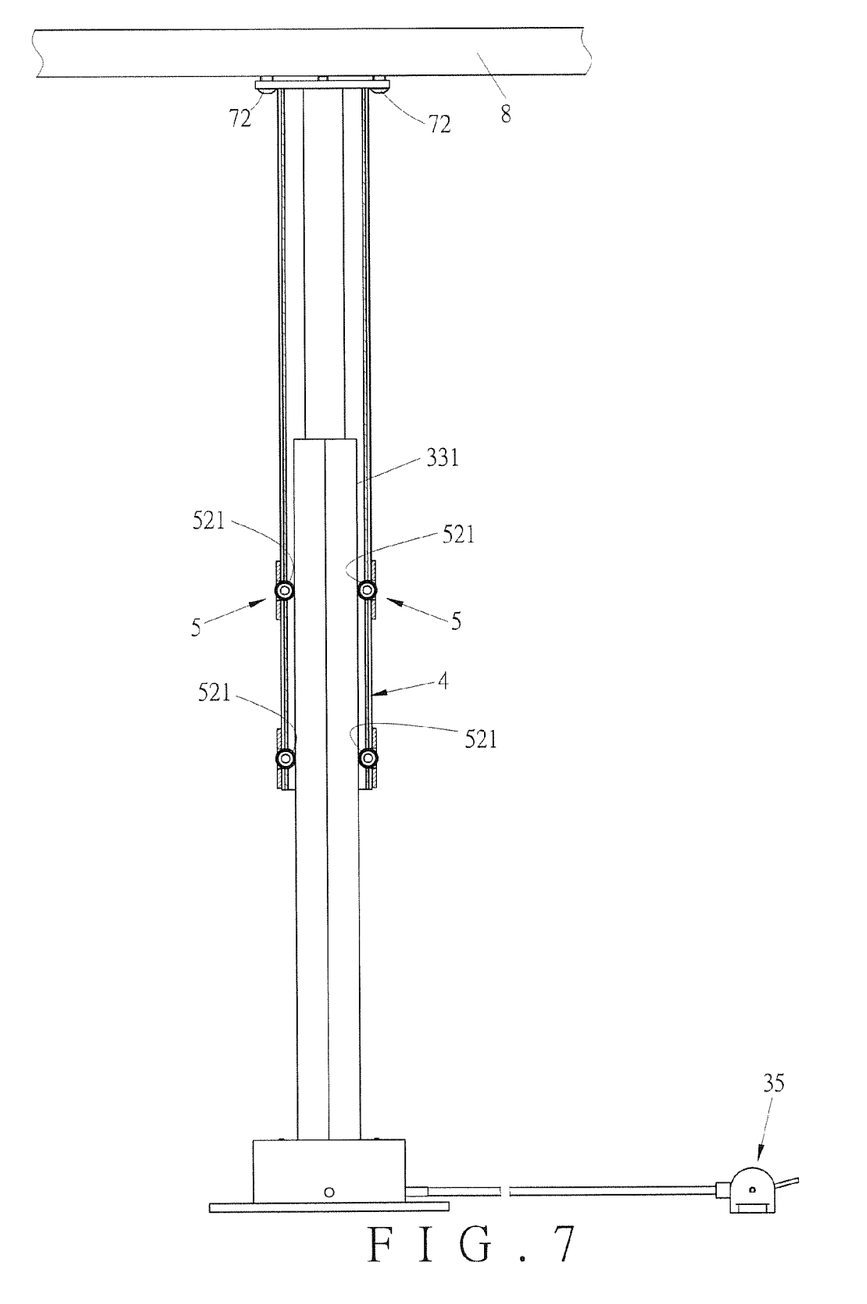
FIG. 7 is similar to FIG. 5 but depicts the lifting device upholding the external object.

Referring to FIGS. 3, 5 and 7, in use, the lifting device is suitable to lift and lower an external object 8, which may be a table top of a tulip table, a table top of a dining table, a table top of a compute table, a cushion stool, and so on. In the present embodiment illustrated the external object is a table top of a tulip table, but in other embodiments is not limited thereto. By placing the external object 8 on the combining plate 6 of the lifting device, passing the second screw members 72 through the fixing holes 63 of the combining plate 6 from below, and screwing the second screw members 72 into the bottom of the external object 8, the lifting device can be assembled to the external object 8 from below. It is to be noted that for ensuring even force distribution during the subsequent lifting and lower operations, the lifting device is preferably assembled to the center of the external object 8. Then, when a user wants to lift the external object 8, he/she can easily depress the controlling member 35 to make the activating cylinder 34 drive the activating shaft 32 to expand. At this time, since the external object 8, the combining plate 6, the activating shaft 32 and the moving tube 4 are connected, the external object 8, the combining plate 6 and the moving tube 4 are lifted as the activating shaft 32 expands. Once the user stops depressing the controlling member 35, the activating cylinder 34 stops moving and gets positioned. Moreover, when the user wants to lower the external object 8, he/she can easily depress the controlling member 35 while manually depressing the external object 8 to an altitude he/she desires. Then when he/she releases the controlling member 35, the external object 8 is positioned at where it is. Since the rollers 52 installed on the moving tube 4 maintain surface contact with the flat surfaces 331 of the sleeve 33, the contact pressure is distributed without concentrating on any single point. This helps to not only prevent the barrels 521 of the rollers 52 to become worn prematurely, but also ensure steady movement of the moving tube 4 with respect to the sleeve 33, thereby making the external object 8 go up or down stably and reliably.

To sum up, the present invention uses a rolling unit 5 with simple structure, so the assembling work is easy and time-saving. Additionally, with the rolling unit 5, the rollers 52 on the moving tube 4 and the flat surfaces 331 of the sleeve 33 maintain surface contact throughout the process where the activating cylinder 34 drives the activating shaft 32 to expand and retract. Since the contact pressure is distributed but not focused on one single point, the barrels 521 of the rollers 52 can be protected from excessive wear. Also, steady upward and downward movement of the moving tube 4 with respect to the sleeve 33 is ensured. As a result, the external object 8 can receive reliable support and is prevented from fluctuation during displacement.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A lifting device for lifting and lowering an external object, the lifting device comprising:
   a driving unit including:
      an activating shaft having a first end thereof connected to a bottom of the external object,
      a sleeve that is fixed around the activating shaft, the sleeve having at least two axially extending flat surfaces, an activating cylinder that is connected to end a second end of the activating shaft opposite the first end, the activating cylinder driving the activating shaft to expand and retract with respect to the sleeve, and a controlling member that is connected to the activating cylinder, the controlling member controlling operation of the activating cylinder;

a moving tube being mounted around the sleeve, the moving tube having an upper end thereof connected to the bottom of the external object, so that when the activating shaft expands or retracts with respect to the sleeve the moving tube is synchronously driven to move upward or downward; and a rolling unit including a plurality of rollers that are rotatably attached to the moving tube and maintain contact with the flat surfaces of the sleeve, wherein each said roller includes:

a barrel, an axle that passes through the barrel, the axle having two ends each affixed to the moving tube, and two bearings that are separated and disposed between the barrel and the axle so as to allow the barrel to rotate about the axle.

2. The lifting device of claim 1, wherein:

the moving tube is defined by a polygonal tube wall, said tube wall including:

a plurality of mounting planes extending axially, a plurality of joining planes each linking two adjacent said mounting planes, a plurality of through holes formed on the mounting planes, and a plurality of threaded bores formed at an upper end edge of the tube wall and aligned with the joining planes; and each of the plurality of rollers are received in one of said plurality of through holes of the moving tube, such that the barrels of each of the plurality of rollers are partially exposed outside the through hole, the barrels of each of the plurality of rollers continuously pressing on the corresponding flat surface of the sleeve.

3. The lifting device of claim 2, further comprising a combining plate and a fixing unit, the combining plate including a plurality of positioning holes and a plurality of fixing holes, the fixing unit including a plurality of first screw members and a plurality of second screw members, wherein:

the combining plate is disposed on top of the activating shaft, the sleeve, and the moving tube, the positioning holes of the combining plate are vertically aligned with the threaded bores of the moving tube, the first screw members pass through the positioning holes of the combining plate and are screwed into the threaded bores, and the second screw members pass through the fixing holes of the combining plate and are screwed into the bottom of the external object.

4. The lifting device of claim 3, wherein:

the combining plate further includes a central threaded hole, the activating shaft includes a projecting screw portion for combining with the central threaded hole, the projecting screw portion disposed on the first end of the activating shaft, and the positioning holes and the fixing holes surround the central threaded hole.

5. The lifting device of claim 1, wherein:

the driving unit further includes a base that has a positioning socket and a lid, the activating cylinder is installed in the positioning socket such that the activating shaft is exposed outside the lid, and the sleeve has a lower end thereof fixed to the lid.

6. The lifting device of claim 2, wherein the activating cylinder is a pneumatic cylinder.

* * * * *